United States Patent
Lin

(10) Patent No.: US 10,361,636 B2
(45) Date of Patent: Jul. 23, 2019

(54) SYNCHRONOUS RECTIFIER APPLIED TO A POWER CONVERTER AND OPERATION METHOD THEREOF

(71) Applicant: Leadtrend Technology Corp., Hsinchu County (TW)

(72) Inventor: Chung-Wei Lin, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 15/952,259

(22) Filed: Apr. 13, 2018

(65) Prior Publication Data

US 2018/0309377 A1 Oct. 25, 2018

(30) Foreign Application Priority Data

Apr. 21, 2017 (TW) .............................. 106113362 A

(51) Int. Cl.
*H02M 3/335* (2006.01)
*H02M 1/08* (2006.01)
*H02M 1/00* (2006.01)

(52) U.S. Cl.
CPC .......... *H02M 3/33592* (2013.01); *H02M 1/08* (2013.01); *H02M 2001/0032* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569

USPC .................................. 363/21.06, 21.14, 127
See application file for complete search history.

(56) References Cited

U.S. PATENT DOCUMENTS 9,991,810 B2 * 6/2018 Choi ....................... H02M 1/08
2016/0190942 A1 * 6/2016 Kikuchi ............ H02M 3/33507
                                                    363/21.14

* cited by examiner

*Primary Examiner* — Yusef A Ahmed
*Assistant Examiner* — Bryan R Perez
(74) *Attorney, Agent, or Firm* — Winston Hsu

(57) ABSTRACT

A synchronous rectifier applied to a power converter includes a control signal generation circuit, a pre-attenuation circuit, and a gate driving circuit. The control signal generation circuit generates a control signal corresponding to a previous period of a secondary side of the power converter according to a detection signal corresponding to the previous period, a first reference voltage, and a second reference voltage when the secondary side is turned on. The control signal corresponding to the previous period corresponds to a discharge time of the previous period. The pre-attenuation circuit pre-attenuates agate control signal corresponding to a current period of the secondary side and generates a pre-attenuation signal corresponding to the current period according to the discharge time. The gate driving circuit drives the gate control signal according to the control signal corresponding to the current period, and stops driving the gate control signal according to the pre-attenuation signal.

8 Claims, 5 Drawing Sheets

SYNCHRONOUS RECTIFIER APPLIED TO A POWER CONVERTER AND OPERATION METHOD THEREOF

BACKGROUND OF THE INVENTION

1. Field of the Invention

The present invention relates to a synchronous rectifier applied to a power converter and an operation method thereof, and particularly to a synchronous rectifier and an operation method thereof that can pre-attenuate a gate control signal corresponding to a current period of a secondary side of a power converter according to a discharge time corresponding to a previous period of the secondary side of the power converter.

2. Description of the Prior Art

As shown in FIG. 1, in a continuous conduction mode (CCM) of a power converter 100, a synchronous rectifier 200 applied to a secondary side SEC of the power converter 100 generates agate control signal GCS for controlling a synchronous switch 102 according to a detection signal VDET (that is, a source voltage of the synchronous switch 102) of the secondary side SEC of the power converter 100 when the secondary side SEC of the power converter 100 is turned on, wherein in the continuous conduction mode of the power converter 100, the prior art utilizes the synchronous rectifier 200 to quickly disable the gate control signal GCS according to the detection signal VDET to prevent a primary side PRI of the power converter 100 and the secondary side SEC of the power converter 100 from being turned on simultaneously.

As shown in FIG. 2, when the secondary side SEC of the power converter 100 is turned on, the detection signal VDET is gradually increased from a minimum voltage VMIM (about −0.7V). Therefore, at a time T1, when the detection signal VDET is increased to a first reference voltage VREF1 (about −50 mV), the synchronous rectifier 200 pre-attenuates the gate control signal GCS. Then, at a time T2, when the detection signal VDET is increased to a second reference voltage VREF2 (above −10 mV), the synchronous rectifier 200 will completely disable the gate control signal GCS.

However, when a load 104 coupled to the secondary side SEC of the power converter 100 is very heavy, because the detection signal VDET may not be increased to the first reference voltage VREF1, the synchronous rectifier 200 will fail to pre-attenuate the gate control signal GCS, resulting in the synchronous rectifier 200 needing to directly disable the gate control signal GCS. In addition, when the load 104 coupled to the secondary side SEC of the power converter 100 is light, because the detection signal VDET may be quickly increased to the first reference voltage VREF1, the synchronous switch 102 operates in a triode region thereof inmost of the time, resulting in efficiency of the power converter 100 becoming poor.

Therefore, how to improve the above mentioned prior art has become an important issue of a designer of the synchronous rectifier 200.

SUMMARY OF THE INVENTION

An embodiment of the present invention provides a synchronous rectifier applied to a power converter. The synchronous rectifier includes a control signal generation circuit, a pre-attenuation circuit, and a gate driving circuit. The control signal generation circuit is used for generating a control signal corresponding to a previous period of a secondary side of the power converter according to a detection signal corresponding to the previous period of a secondary side, a first reference voltage, and a second reference voltage when the secondary side of the power converter is turned on, wherein the control signal corresponding to the previous period corresponds to a discharge time of the previous period. The pre-attenuation circuit is coupled to the control signal generation circuit for pre-attenuating a gate control signal corresponding to a current period of the secondary side according to the discharge time of the previous period and generating a pre-attenuation signal corresponding to the current period. The gate driving circuit is coupled to the control signal generation circuit and the pre-attenuation circuit for driving the gate control signal corresponding to the current period according to the control signal corresponding to the current period, and stopping driving the gate control signal corresponding to the current period according to the pre-attenuation signal corresponding to the current period.

Another embodiment of the present invention provides an operation method of a synchronous rectifier applied to a power converter, wherein the synchronous rectifier includes a control signal generation circuit, a pre-attenuation circuit, and a gate driving circuit. The operation method includes the control signal generation circuit generating a control signal corresponding to a previous period of a secondary side of the power converter according to a detection signal corresponding to the previous period of the secondary side of the power converter, a first reference voltage, and a second reference voltage when the secondary side of the power converter is turned on, wherein the control signal corresponding to the previous period corresponds to a discharge time of the previous period; and the pre-attenuation circuit pre-attenuating a gate control signal corresponding to a current period of the secondary side according to the discharge time of the previous period and generating a pre-attenuation signal corresponding to the current period.

The present invention provides a synchronous rectifier applied to a power converter and an operation method thereof. The synchronous rectifier and the operation method utilize a control signal generation circuit of the synchronous rectifier to generate a control signal corresponding to a previous period of a secondary side of the power converter according to a detection signal corresponding to the previous period of the secondary side, a first reference voltage, and a second reference voltage when the secondary side of the power converter is turned on, and utilize a pre-attenuation circuit of the synchronous rectifier to pre-attenuate a gate control signal corresponding to a current period of the secondary side according to a discharge time (corresponding to the control signal of the previous period) corresponding to the previous period. Because the synchronous rectifier and the operation method pre-attenuate the gate control signal corresponding to the current period according to the discharge time corresponding to the previous period, the synchronous rectifier does not pre-attenuate the gate control signal corresponding to the current period early to prevent a synchronous switch from operating in a triode region thereof in most of the time when a load is coupled to the secondary side of the power converter is light, and the synchronous rectifier does also not need to directly disable the gate control signal corresponding to the current period when the load is very heavy.

These and other objectives of the present invention will no doubt become obvious to those of ordinary skill in the art

DETAILED DESCRIPTION

Figure 1:
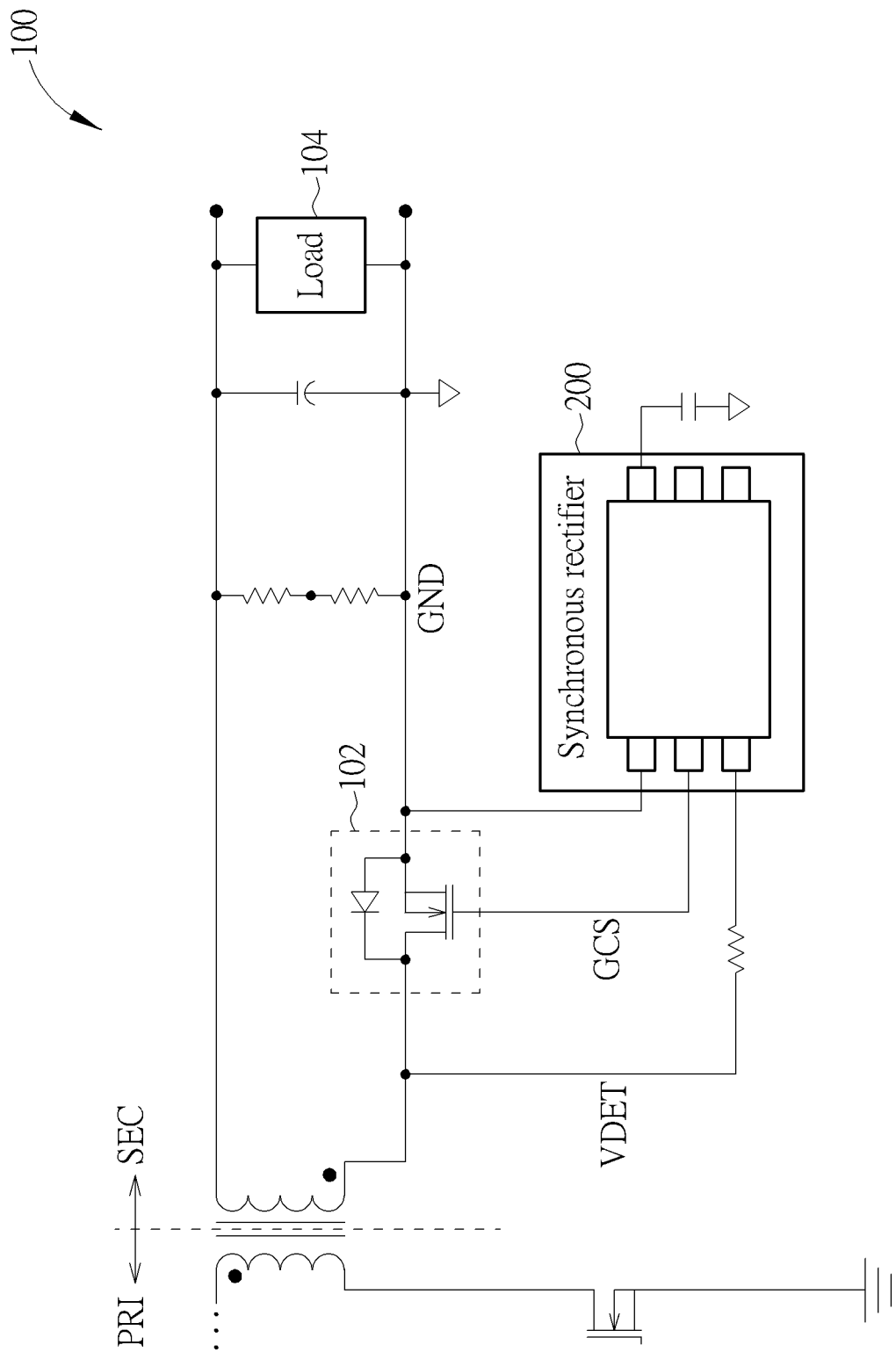
FIG. 1 is a diagram illustrating a synchronous rectifier applied to a secondary side of a power converter.
Figure 2:
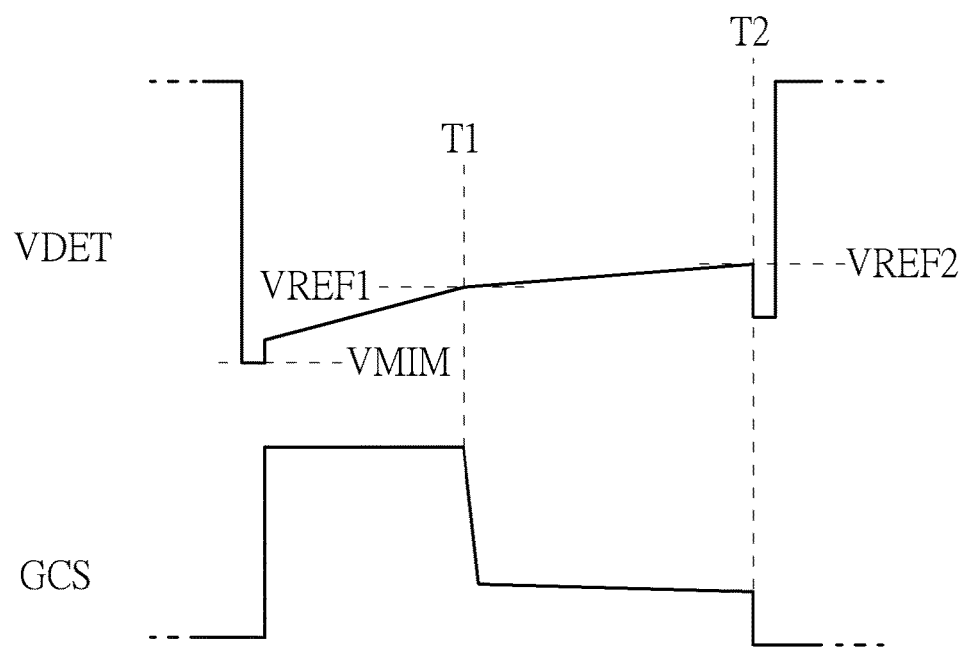
FIG. 2 is a diagram illustrating timings of the detection signal and the gate control signal.
Figure 3:
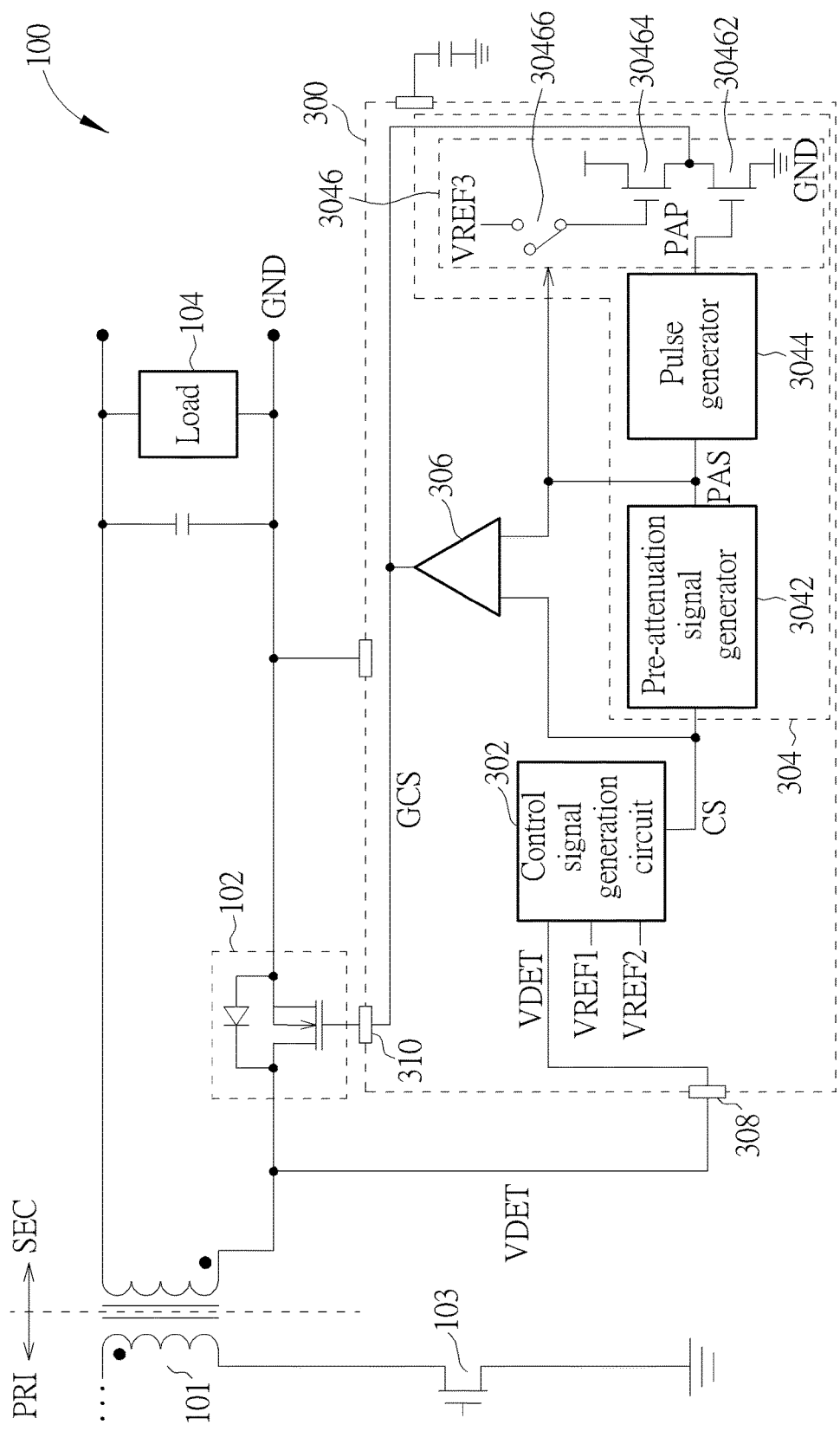
FIG. 3 is a diagram illustrating a synchronous rectifier applied to a secondary side of a power converter according to a first embodiment of the present invention.
Figure 4:
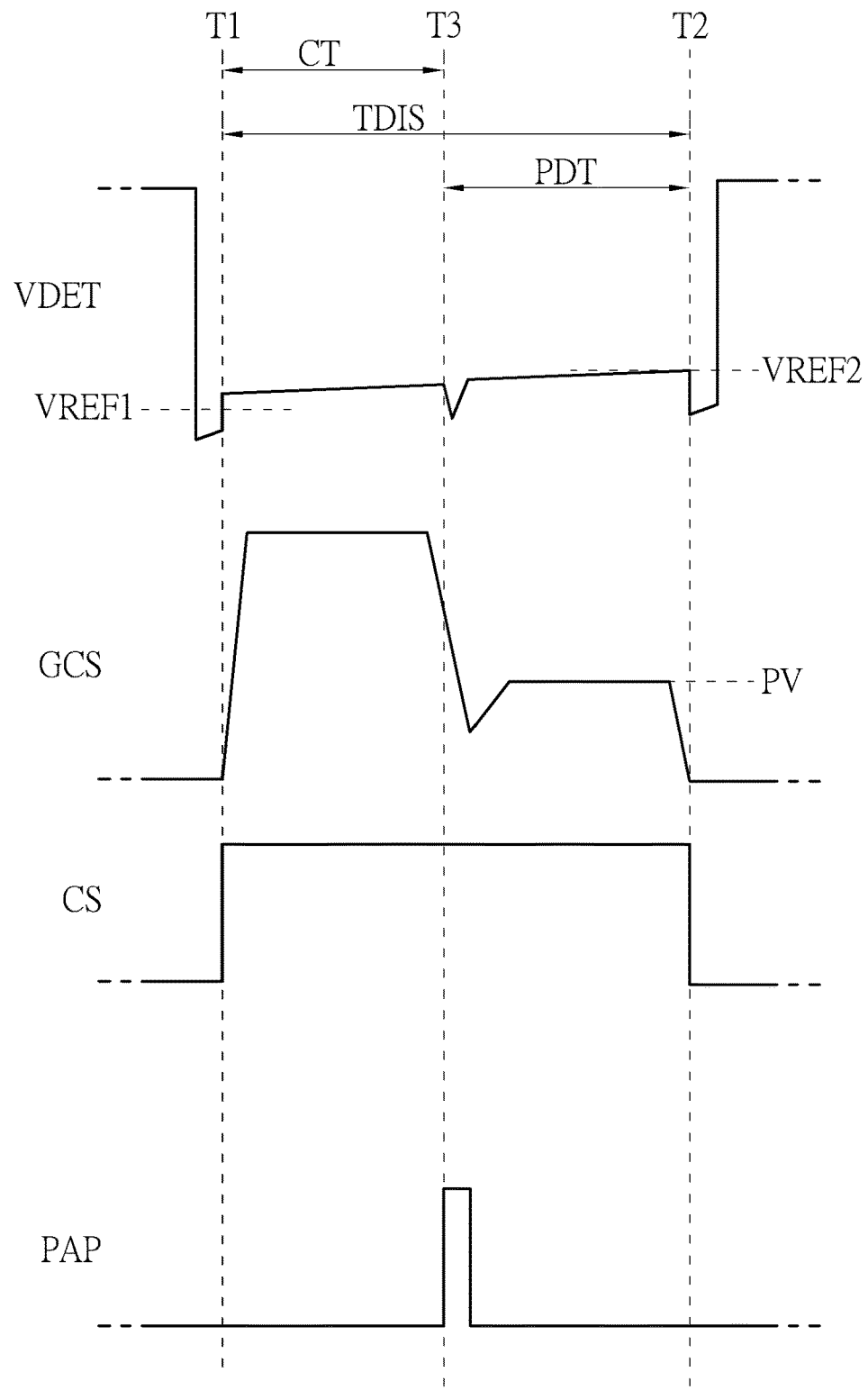
FIG. 4 is a diagram illustrating timings of the detection signal, the control signal, the gate control signal, and pre-attenuation pulse.

Please refer to FIG. 3. FIG. 3 is a diagram illustrating a synchronous rectifier 300 applied to a secondary side SEC of a power converter 100 according to a first embodiment of the present invention, wherein in regard to a primary side PRI of the power converter 100, FIG. 3 only shows a primary side winding 101 and a power switch 103, the power converter 100 is an alternating current/direct current power converter, the synchronous rectifier 300 is suitable for a continuous conduction mode of the power converter 100, and a label "GND" represents ground. As shown in FIG. 3, the synchronous rectifier 300 includes a control signal generation circuit 302, a pre-attenuation circuit 304, and a gate driving circuit 306, wherein the pre-attenuation circuit 304 is coupled to the control signal generation circuit 302, and the gate driving circuit 306 is coupled to the control signal generation circuit 302 and the pre-attenuation circuit 304. When the secondary side SEC of the power converter 100 is turned on, the control signal generation circuit 302 receives a detection signal VDET (that is, a source voltage of a synchronous switch 102 of the secondary side SEC of the power converter 100) corresponding to a current period of the secondary side SEC of the power converter 100 through a pin 308 of the synchronous rectifier 300. After the control signal generation circuit 302 receives the detection signal VDET corresponding to the current period of the secondary side SEC, the control signal generation circuit 302 can generate a control signal CS corresponding to the current period according to the detection signal VDET corresponding to the current period of the secondary side SEC, a first reference voltage VREF1, and a second reference voltage VREF2, wherein timings of the detection signal VDET corresponding to the current period of the secondary side SEC and the control signal CS corresponding to the current period are shown in FIG. 4. As shown in FIG. 4, at a time T1, the control signal generation circuit 302 can enable the control signal CS corresponding to the current period according to the detection signal VDET corresponding to the current period of the secondary side SEC and the first reference voltage VREF1, and at a time T2, the control signal generation circuit 302 can disable the control signal CS corresponding to the current period according to the detection signal VDET corresponding to the current period of the secondary side SEC and the second reference voltage VREF2, wherein the second reference voltage VREF2 is greater than the first reference voltage VREF1. Therefore, as shown in FIG. 4, the control signal CS corresponding to the current period corresponds to a discharge time TDIS of the current period. In addition, as shown in FIG. 4, the gate driving circuit 306 is used for driving the gate control signal GCS corresponding to the current period according to the control signal CS corresponding to the current period, the gate control signal GCS corresponding to the current period is transmitted to the synchronous switch 102 of the secondary side SEC of the power converter 100 through a pin 310 of the synchronous rectifier 300, and the gate control signal GCS corresponding to the current period is used for controlling turning-on and turning-off of a synchronous switch 102.

As shown in FIG. 3, the pre-attenuation circuit 304 includes a pre-attenuation signal generator 3042, a pulse generator 3044, and a pull-down circuit 3046, wherein the pre-attenuation signal generator 3042 is coupled to the control signal generation circuit 302, the pulse generator 3044 is coupled to the pre-attenuation signal generator 3042, the pull-down circuit 3046 is coupled to the pulse generator 3044 and the pre-attenuation signal generator 3042, and the pull-down circuit 3046 includes a first N-type metal-oxide-semiconductor transistor 30462, a second N-type metal-oxide-semiconductor transistor 30464, and a switch 30466. In addition, coupling relationships between the control signal generation circuit 302, the gate driving circuit 306, the pre-attenuation signal generator 3042, the pulse generator 3044, the first N-type metal-oxide-semiconductor transistor 30462, the second N-type metal-oxide-semiconductor transistor 30464, and the switch 30466 can be referred to FIG. 3, so further description thereof is omitted for simplicity.

The pre-attenuation signal generator 3042 can generate a current pre-attenuation time CT (as shown in FIG. 4) corresponding to the current period and a pre-attenuation signal PAS corresponding to the current pre-attenuation time CT (wherein the pre-attenuation signal PAS corresponding to the current pre-attenuation time CT also corresponds to the current period) according to a discharge time (corresponding to the control signal CS of a previous period of the secondary side SEC of the power converter 100) corresponding to the previous period of the secondary side SEC of the power converter 100. For example, at first, the pre-attenuation signal generator 3042 can generate a first pre-attenuation time corresponding to a first period of the secondary side SEC of the power converter 100 and a pre-attenuation signal corresponding to the first pre-attenuation time according to a discharge time corresponding to a 0th period of the secondary side SEC of the power converter 100 and a default time; then, the pre-attenuation signal generator 3042 can generate a second pre-attenuation time corresponding to a second period of the secondary side SEC of the power converter 100 and a pre-attenuation signal corresponding to the second pre-attenuation time according to the discharge time corresponding to the first period of the secondary side SEC of the power converter 100 and the first pre-attenuation time; then, the pre-attenuation signal generator 3042 can generate a third pre-attenuation time corresponding to a third period of the secondary side SEC of the power converter 100 and a pre-attenuation signal corresponding to the third pre-attenuation time according to the discharge time corresponding to the second period of the secondary side SEC of the power converter 100 and the second pre-attenuation time; and so on, wherein the third period is after the second period, the second period is after the first period, and the first period is after the 0th period. Therefore, the current pre-attenuation time CT corresponding to the current period of the secondary side SEC of the power converter 100 generated by the pre-attenuation signal generator 3042 according to the discharge time corresponding to the previous period of the secondary side SEC of the power converter 100 will be gradually close to the discharge time corresponding to the previous period of the secondary side SEC of the power converter 100. But the pre-attenuation signal generator 3042 can make a pseudo dead time PDT (as shown in FIG. 4) is not less than a predetermined time interval.

In addition, in one embodiment of the present invention, the pre-attenuation signal generator 3042 can average the discharge time corresponding to the 0th period and the default time to generate the first pre-attenuation time corresponding to the first period of the secondary side SEC of the power converter 100. But, the present invention is not limited to the pre-attenuation signal generator 3042 averaging the discharge time corresponding to the 0th period and the default time to generate the first pre-attenuation time corresponding to the first period of the secondary side SEC of the power converter 100. That is to say, the pre-attenuation signal generator 3042 can also weight the discharge time corresponding to the 0th period and the default time to generate the first pre-attenuation time corresponding to the first period of the secondary side SEC of the power converter 100. Therefore, any configuration in which the pre-attenuation signal generator 3042 utilizes the discharge time corresponding to the previous period of the secondary side SEC of the power converter 100 to generate the current pre-attenuation time CT corresponding to the current period of secondary side SEC of the power converter 100 falls within the scope of the present invention As shown in FIG. 3, after the pre-attenuation signal generator 3042 generates the pre-attenuation signal PAS corresponding to the current period, the gate driving circuit 306 will stop driving the gate control signal GCS corresponding to the current period.

In addition, as shown in FIG. 4, the pulse generator 3044 generates a pre-attenuation pulse PAP corresponding to the current period at a time T3 according to the pre-attenuation signal PAS corresponding to the current period. Therefore, as shown in FIG. 3, after the pulse generator 3044 generates the pre-attenuation pulse PAP corresponding to the current period, the first N-type metal-oxide-semiconductor transistor 30462 is turned on. Because the gate driving circuit 306 stops driving the gate control signal GCS corresponding to the current period, the gate control signal GCS corresponding to the current period will be pre-attenuated (as shown in FIG. 4). In addition, because the switch 30466 is turned on according to the pre-attenuation signal PAS corresponding to the current period, the second N-type metal-oxide-semiconductor transistor 30464 is turned on according to a third reference voltage VREF3, resulting in the gate control signal GCS corresponding to the current period being stabilized at a predetermined voltage PV (as shown in FIG. 4), wherein the predetermined voltage PV can be determined according to the third reference voltage VREF3, a threshold voltage VTH30464 of the second N-type metal-oxide-semiconductor transistor 30464, and equation (1):

$$PV = VREF3 - VTH30464 \quad (1)$$

In addition, in another embodiment of the present invention, the switch 30466 and the second N-type metal-oxide-semiconductor transistor 30464 can be replaced with a clamp circuit. That is to say, the clamp circuit can stabilize the gate control signal GCS at the predetermined voltage PV according to the pre-attenuation signal PAS corresponding to the current period.

Because the synchronous rectifier 300 pre-attenuates the gate control signal GCS corresponding to the current period according to the discharge time corresponding to the previous period, the synchronous rectifier 300 does not pre-attenuate the gate control signal GCS corresponding to the current period early to prevent the synchronous switch 102 from operating in a triode region thereof in most of the time when a load 104 is coupled to the secondary side SEC of the power converter 100 is light, and the synchronous rectifier 300 does not need to directly disable the gate control signal GCS corresponding to the current period when the load 104 is very heavy.

Figure 5:
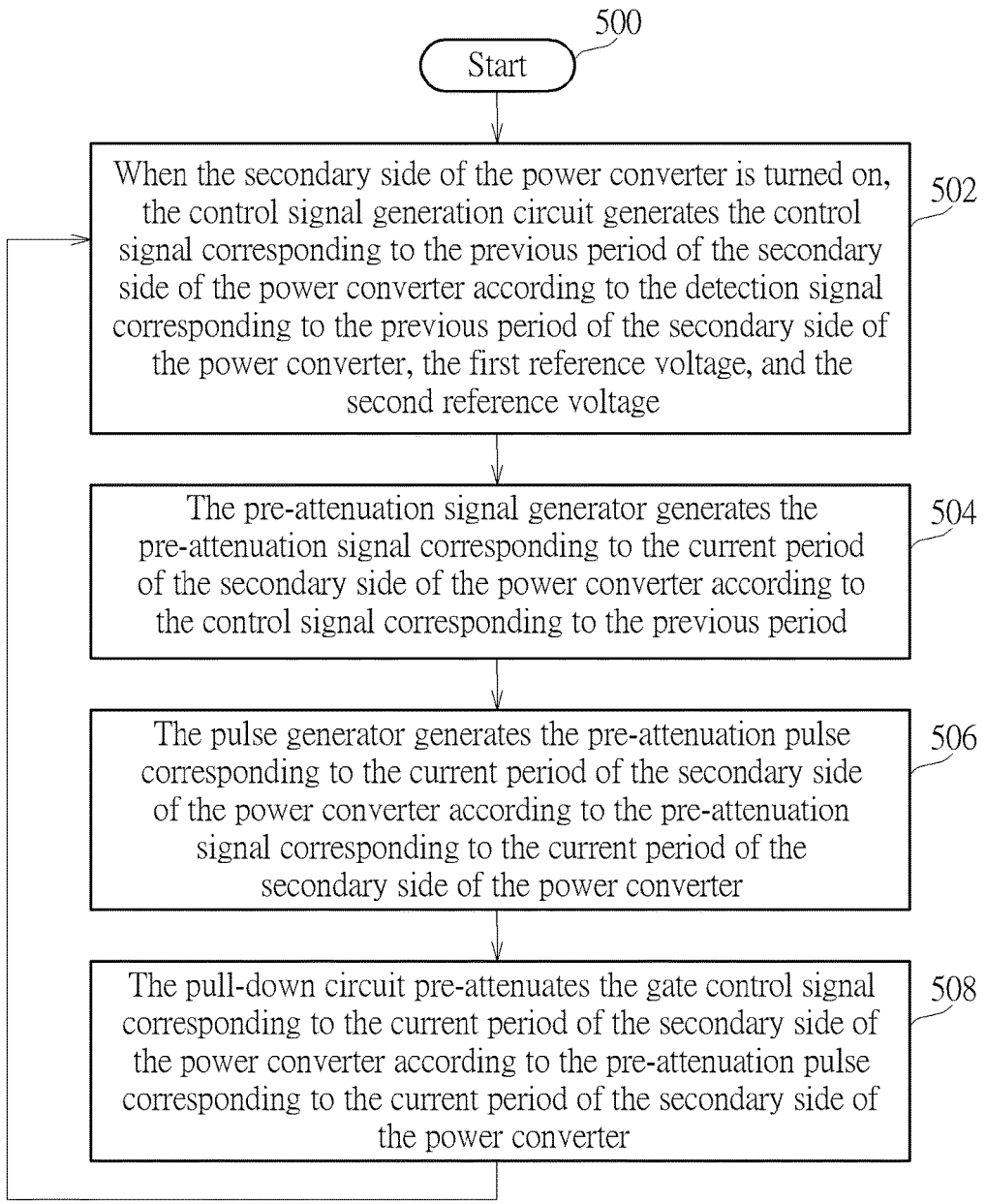
FIG. 5 is a flowchart illustrating an operation method of a synchronous rectifier applied to a power converter according to a second embodiment of the present invention.

Please refer to FIGS. 3-5. FIG. 5 is a flowchart illustrating an operation method of a synchronous rectifier applied to a power converter according to a second embodiment of the present invention. The operation method in FIG. 5 is illustrated using the power converter 100 and the synchronous rectifier 300 in FIG. 3. Detailed steps are as follows:

Step 500: Start.

Step 502: When the secondary side SEC of the power converter 100 is turned on, the control signal generation circuit 302 generates the control signal CS corresponding to the previous period of the secondary side SEC of the power converter 100 according to the detection signal VDET corresponding to the previous period of the secondary side SEC of the power converter 100, the first reference voltage VREF1, and the second reference voltage VREF2.

Step 504: The pre-attenuation signal generator 3042 generates the pre-attenuation signal PAS corresponding to the current period of the secondary side SEC of the power converter 100 according to the control signal CS corresponding to the previous period.

Step 506: The pulse generator 3044 generates the pre-attenuation pulse PAP corresponding to the current period of the secondary side SEC of the power converter 100 according to the pre-attenuation signal PAS corresponding to the current period of the secondary side SEC of the power converter 100.

Step 508: The pull-down circuit 3046 pre-attenuates the gate control signal GCS corresponding to the current period of the secondary side SEC of the power converter 100 according to the pre-attenuation pulse PAP corresponding to the current period of the secondary side SEC of the power converter 100, go to Step 502.

In Step 502, when the secondary side SEC of the power converter 100 is turned on during the previous period of the secondary side SEC of the power converter 100, the control signal generation circuit 302 receives the detection signal VDET corresponding to the previous period through the pin 308 of the synchronous rectifier 300. After the control signal generation circuit 302 receives the detection signal VDET corresponding to the previous period, the control signal generation circuit 302 can generate the control signal CS corresponding to the previous period according to the detection signal VDET corresponding to the previous period, the first reference voltage VREF1, and the second reference voltage VREF2. Similarly, when the secondary side SEC of the power converter 100 is turned on during the current period of the secondary side SEC of the power converter 100, the control signal generation circuit 302 can also generate the control signal CS corresponding to the current period according to the detection signal VDET corresponding to the current period of the secondary side SEC, the first reference voltage VREF1, and the second reference voltage VREF2.

In Step 504, as shown in FIG. 3, the pre-attenuation signal generator 3042 can generate the current pre-attenuation time CT (as shown in FIG. 4) corresponding to the current period and the pre-attenuation signal PAS corresponding to the current pre-attenuation time CT according to the discharge time (corresponding to the control signal CS of the previous period of the secondary side SEC of the power converter 100) corresponding to the previous period of the secondary side SEC of the power converter 100. Therefore, the current pre-attenuation time CT corresponding to the current period of the secondary side SEC of the power converter 100 generated by the pre-attenuation signal generator 3042 according to the discharge time corresponding to the previous period of the secondary side SEC of the power converter 100 will be gradually close to the discharge time corresponding to the previous period of the secondary side SEC of the power converter 100. But the pre-attenuation signal generator 3042 can make a pseudo dead time PDT (as shown in FIG. 4) is not less than the predetermined time interval.

In Step 506 and Step 508, as shown in FIG. 4, the pulse generator 3044 generates the pre-attenuation pulse PAP corresponding to the current period at the time T3 according to the pre-attenuation signal PAS corresponding to the current period. Therefore, as shown in FIG. 3, after the pulse generator 3044 generates the pre-attenuation pulse PAP corresponding to the current period, the first N-type metal-oxide-semiconductor transistor 30462 is turned on. Because the gate driving circuit 306 stops driving the gate control signal GCS corresponding to the current period, the gate control signal GCS corresponding to the current period will be pre-attenuated (as shown in FIG. 4). In addition, because the switch 30466 is turned on according to the pre-attenuation signal PAS corresponding to the current period, the second N-type metal-oxide-semiconductor transistor 30464 is turned on according to the third reference voltage VREF3, resulting in the gate control signal GCS corresponding to the current period being stabilized at the predetermined voltage PV (as shown in FIG. 4).

In addition, as shown in FIGS. 3, 4, the gate driving circuit 306 can drive the gate control signal GCS corresponding to the current period according to the control signal CS corresponding to the current period, and the gate driving circuit 306 will stop driving the gate control signal GCS corresponding to the current period after the pre-attenuation signal generator 3042 generates the pre-attenuation signal PAS corresponding to the current period.

To sum up, the synchronous rectifier and the operation method thereof utilize the control signal generation circuit to generate the control signal corresponding to the previous period according to the detection signal corresponding to the previous period of the secondary side, the first reference voltage, and the second reference voltage when the secondary side of the power converter is turned on, and utilize the pre-attenuation circuit to pre-attenuate the gate control signal corresponding to the current period of the secondary side according to the discharge time (corresponding to the control signal of the previous period) corresponding to the previous period. Because the synchronous rectifier and the operation method pre-attenuate the gate control signal corresponding to the current period according to the discharge time corresponding to the previous period, the synchronous rectifier does not pre-attenuate the gate control signal corresponding to the current period early to prevent the synchronous switch from operating in the triode region thereof in most of the time when the load is coupled to the secondary side of the power converter is light, and the synchronous rectifier does also not need to directly disable the gate control signal corresponding to the current period when the load is very heavy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronous rectifier applied to a power converter, comprising:
   a control signal generation circuit for generating a control signal corresponding to a previous period of a secondary side of the power converter according to a detection signal corresponding to the previous period of a-the secondary side, a first reference voltage, and a second reference voltage when the secondary side of the power converter is turned on, wherein the control signal corresponding to the previous period corresponds to a discharge time of the previous period;
   a pre-attenuation circuit coupled to the control signal generation circuit, wherein the pre-attenuation circuit receives the control signal corresponding to the previous period, and is used for pre-attenuating a gate control signal corresponding to a current period of the secondary side according to the control signal of the previous period and generating a pre-attenuation signal corresponding to the current period; and
   a gate driving circuit coupled to the control signal generation circuit and the pre-attenuation circuit for driving the gate control signal corresponding to the current period according to the control signal corresponding to the current period, and stopping driving the gate control signal corresponding to the current period according to the pre-attenuation signal corresponding to the current period; and a pre-attenuation signal generator coupled to the control signal generation circuit for generating the pre-attenuation signal corresponding to the current period according to the control signal corresponding to the previous period; a pulse generator coupled to the pre-attenuation signal generator for generating a pre-attenuation pulse corresponding to the current period according to the pre-attenuation signal corresponding to the current period; and a pull-down circuit coupled to the pulse generator and the pre-attenuation signal generator for pre-attenuating the gate control signal corresponding to the current period according to the pre-attenuation pulse corresponding to the current period.

2. The synchronous rectifier of claim 1, wherein the detection signal is a source voltage of a synchronous switch of the secondary side.

3. The synchronous rectifier of claim 1, wherein the gate control signal corresponding to the current period is used for controlling turning-on and turning-off of a synchronous switch of the secondary side.

4. The synchronous rectifier of claim 1, wherein the second reference voltage is greater than the first reference voltage.

5. An operation method of a synchronous rectifier applied to a power converter, wherein the synchronous rectifier comprises a control signal generation circuit, a pre-attenuation circuit, and a gate driving circuit, the operation method comprising:
   the control signal generation circuit generating a control signal corresponding to a previous period of a secondary side of the power converter according to a detection signal corresponding to the previous period of the secondary side of the power converter, a first reference voltage, and a second reference voltage when the secondary side of the power converter is turned on, wherein the control signal corresponding to the previous period corresponds to a discharge time of the previous period; and the pre-attenuation circuit receiving the control signal corresponding to the previous period, pre-attenuating a gate control signal corresponding to a current period of the secondary side according to the control signal of the previous period, and generating a pre-attenuation signal corresponding to the current period; and wherein the pre-attenuation circuit pre-attenuating the gate control signal corresponding to the current period of the secondary side according to the discharge time of the previous period and generating the pre-attenuation signal corresponding to the current period comprises: a pre-attenuation signal generator of the pre-attenuation circuit generating the pre-attenuation signal corresponding to the current period according to the control signal corresponding to the previous period; a pulse generator of the pre-attenuation circuit generating a pre-attenuation pulse corresponding to the current period according to the pre-attenuation signal corresponding to the current period; and a pull-down circuit of the pre-attenuation circuit pre-attenuating the gate control signal corresponding to the current period according to the pre-attenuation pulse corresponding to the current period.

6. The operation method of claim 5, further comprising:
the gate driving circuit driving the gate control signal corresponding to the current period according to the control signal corresponding to the current period; and
the gate driving circuit stopping driving the gate control signal corresponding to the current period according to the pre-attenuation signal corresponding to the current period.

7. The operation method of claim 5, wherein the detection signal is a source voltage of a synchronous switch of the secondary side.

8. The operation method of claim 5, wherein the gate control signal corresponding to the current period is used for controlling turning-on and turning-off of a synchronous switch of the secondary side.

* * * * *